June 3, 1941. T. J. HOY 2,243,865
POWER REVERSE GEAR FOR STEAM LOCOMOTIVES AND THE LIKE
Filed Jan. 30, 1940 3 Sheets-Sheet 2

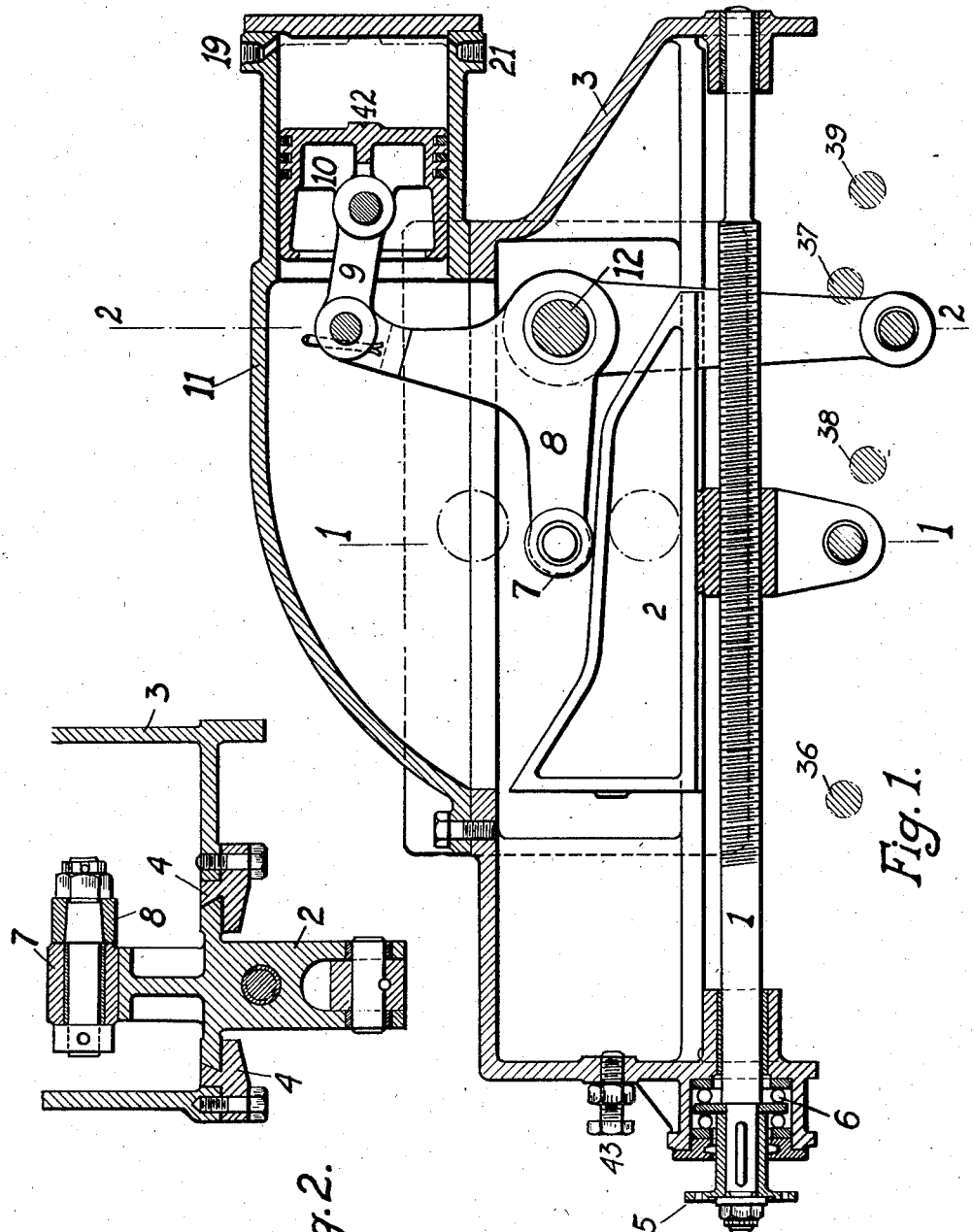

Thomas J. Hoy
INVENTOR

June 3, 1941.  T. J. HOY  2,243,865
POWER REVERSE GEAR FOR STEAM LOCOMOTIVES AND THE LIKE
Filed Jan. 30, 1940   3 Sheets-Sheet 3
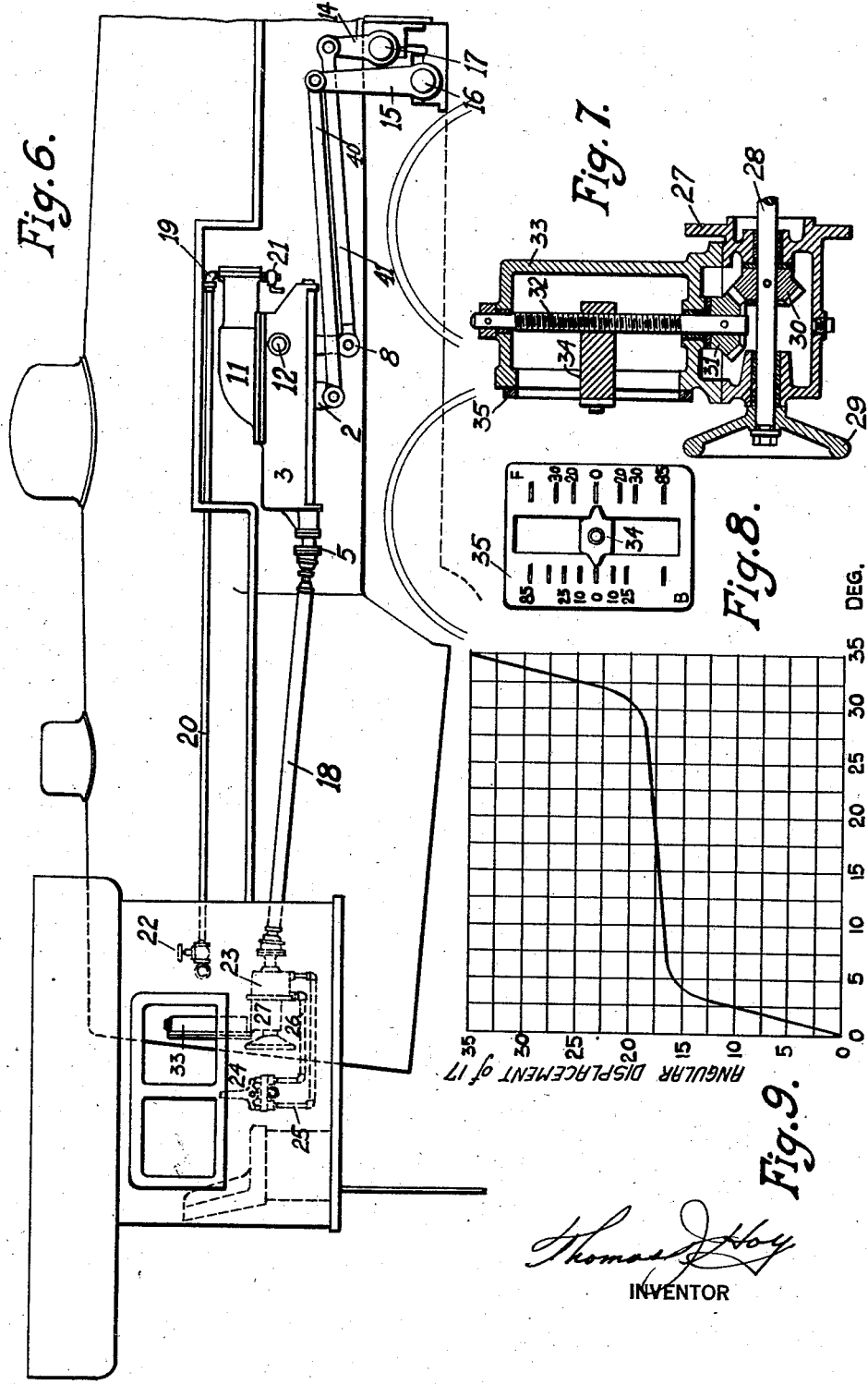

Patented June 3, 1941

2,243,865

UNITED STATES PATENT OFFICE 2,243,865

POWER REVERSE GEAR FOR STEAM LOCOMOTIVES AND THE LIKE

Thomas J. Hoy, Newark, N. J.

Application January 30, 1940, Serial No. 316,398

4 Claims. (Cl. 121—162)

This invention relates to power reverse gears and relates particularly to multiple-action power reverse gear, by means of which one single manual control in the cab serves to actuate two or more sets of reversing mechanisms connected to the valve gears.

The invention also relates to power reverse gears of this type adapted to operate in conjunction with poppet valve gears of the oscillating cam type in which the timing of the movement of the cam shafts, which actuate the steam admission poppet valves is independent from the timing of the movement which is imparted to the cam shafts, which actuate the exhaust poppet valves, through the provision of separate valve gears for each of the cam shafts.

The invention can also be advantageouly applied to compound locomotives in which the adjustment of the cut-off in the high-pressure cylinder takes place in a steadily progressive manner, whereas the corresponding adjustment of the cut-off rate in the low pressure cylinder takes place according to a predetermined ratio, which will result in the most economical utilization of the steam and which will be entirely automatic and free from misjudgment on the part of the operator.

At the present time it is the common practice to coordinate the movements of two or more reversing shafts or reversing link connections which control their respective valve gears, in the case of poppet valve gears of the oscillating cam shaft type, by means of intermittent gears. Such control by intermittent gears is objectionable for various reasons, among which may be enumerated the following: Due to the periodical fluctuations of the forces acting on the reverse gear and the inevitable tooth clearance in such intermittent gears, it is impossible to avoid vibrations, which sooner or later will result in premature wear of the teeth of the aforesaid intermittent gears and consequently will result in loss in efficiency. Furthermore, such intermittent gears do not lend themselves very well to subsequent corrections in the action of the reversing shafts if such action is found to be defective on account of the geometrical peculiarities of gear transmission.

The object of this invention is to provide a new method to co-ordinate the movement of two or more reversing shafts or reversing link connections which is a simple mechanism for accomplishing the foregoing and other objects; which can be easily and cheaply made; which is satisfactory in use and does not readily get out of order. More particularly, the invention consists in the provision of numerous features and details of construction which will be hereinafter more fully set forth in the specification and claims.

Referring to the accompanying drawings in which like numerals represent the same parts throughout the several views:

Fig. 1 is a side elevation largely in section, of a device of the character described, which illustrates this invention in its preferred embodiment.

Fig. 2 is a transversal section following the line 1—1 of Figure 1.

Fig. 6 is a side elevation showing the device in its proper relationship with the surrounding structure of the steam locomotive.

Fig. 7 is a sectional view of part of the control mechanism of the device, which serves to give the engineer a visible indication of the adjustment made.

Fig. 8 depicts the indication panel showing the degree of adjustment.

Fig. 9 represents a graph which shows the relationship of the respective angular displacement of the two reversing shafts operated by this invention.

Figure 3:
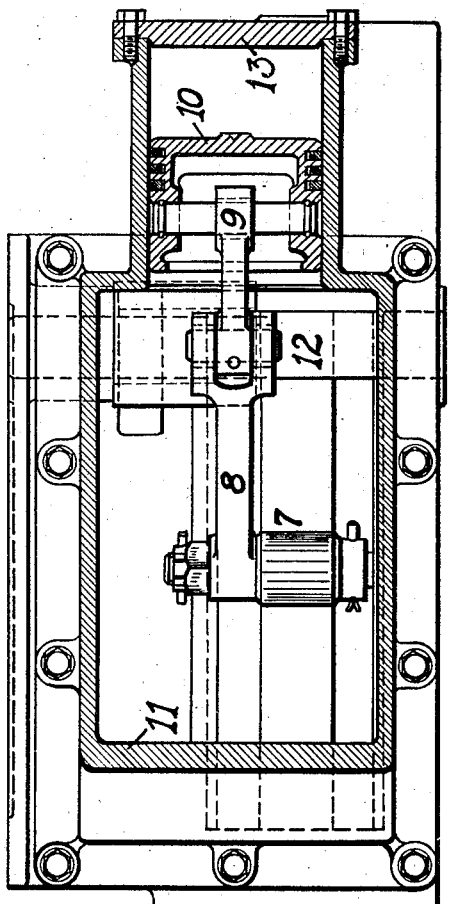
Fig. 3 is a plan view largely in section of the device.
Figure 4:
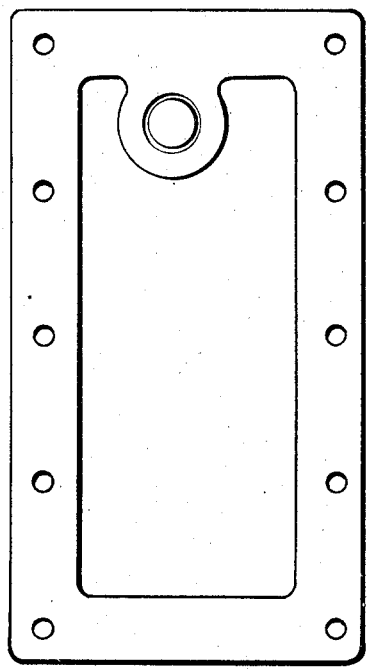
Fig. 4 represents a side elevation of a part of the housing of the device.

The mechanism of this invention is shown in Fig. 6 adapted to actuate two reversing shafts 16 and 17, which are connected in the customary manner to their respective sets of valve gear, by means of links or the like. The reversing shaft 17 may be connected to the valve gear, which controls the oscillating cam shafts which actuate the steam admission poppet valves and the reversing shaft 16 may be connected to the valve gear, which controls the oscillating cam shafts which actuate the exhaust poppet valves.

Such an arrangement is a means for solving the ancient problem of adjusting the cut-off rate in a reciprocating steam engine of the locomotive type, without interfering with the timing of the exhaust events, namely the release point and the compression point, in a manner detrimental to the efficiency of the steam distribution. Up to the present, in a good many applications of the oscillating cam poppet valve gears to steam locomotives, a decrease in the cut-off rate invariably results in a premature release point which adversely affects the expansion ratio of the steam in the cylinders. At the same time an increase in the compression ratio also takes place which tends to reduce still further the mean effective pressure revealed by an indicator diagram.

By referring to Fig. 1 it will be noted that reversing shaft 16 of Fig. 6 is connected directly through arm 15 and rod 40 to a threaded shaft 1, by means of a sliding cam-nut 2, which slides longitudinally within the two dove-tailed guides 4, shown on Fig. 2. Shaft 1 is journaled within housing 3 and a thrust bearing of the ball type 6 takes care of any axial thrusts. Shaft 1 carries an extension flange 5 which connects through a cardan-shaft 18 to a reversible air motor or electric motor 23, which is conveniently located in the cab of the locomotive. This connection through cardan-shaft 18 eliminates not only misalignment troubles, but it also prevents effectively the transmission of reverse gear shocks to the cab because the thread cut into shaft 1 is of the self-locking type and also because one end of the cardan-shaft 18 is free to slide longitudinally within its companion flange due to the provision of a splined slip joint. In the preferred embodiment of this invention, as disclosed by the accompanying drawings, an air motor of the reversible type is shown on Fig. 6, the control of which is effected through a two-way valve 24, which connects through pipes 25 and 26 respectively to the air motor 23. If the handle of this valve 24 is pushed forward compressed air is admitted through pipe 26 to the air motor 23, to result in a movement of the cam-nut 2, which adjusts the valve gear from the full back-gear position to the full fore-gear position. In a similar manner, if the handle of the control valve 24 is pushed backwards, the opposite action of the reverse gear takes place.

In order to improve upon the timing of the exhaust events of the steam cycle in the cylinder, the angular displacement of the reversing shafts 26 and 17 should take place in a manner as graphically illustrated by graph No. 9. It will be apparent from this graph that the respective angular displacements of the shafts 16 and 17 do not take place at a uniform rate. If it is assumed that a uniform speed of rotation of the air motor 23 corresponds to a uniform rate of linear advancement of the cam-nut 2 and results consequently through the attachments by rod 40 and arm 15 to the reversing shaft 16, also in a uniform angular displacement of this said shaft 16, the corresponding rate of angular displacement of the reversing shaft 17 takes place at first at a much faster rate of speed to be followed by a period of very slow advancement which again is succeeded by a period of very fast advancement. By consulting the graph shown in Fig. 9, it will be apparent that from a common point of start which corresponds to a zero mark on this said graph, the shaft 16 advances by two and one-half degrees, whereas the shaft 17 advances by ten degrees, thus establishing a ratio of the respective angular velocities of 4 to 1. Later on in this cycle of movement an advance from ten to twenty-five degrees of the shaft 16 corresponds to a displacement from approximately fourteen to sixteen degrees of the shaft 17, thus establishing in point of fact a variable ratio chain of transmission of movement between 16 and 17 respectively. As a result of such a variable ratio of movement between the aforementioned shafts the best possible timing of the exhaust events in the steam cycle can be obtained. By referring again to Fig. 1, it is noted that this object is attained by shaping the cam profile of cam-nut 2 accordingly. This said profile incorporates between two steep inclinations a relatively flat portion which is noticeable in its effect by referring to Fig. 9.

Figure 5:
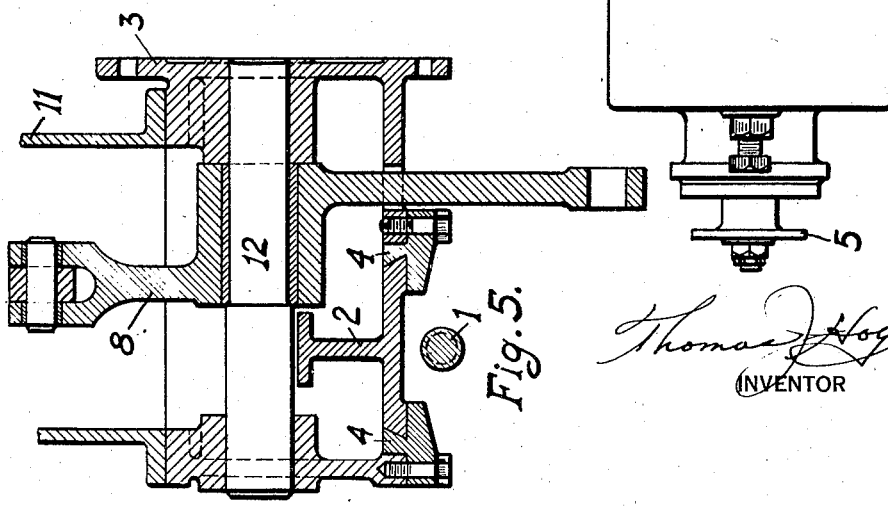
Fig. 5 is a transversal section of following line 2—2 of Figure 1.

The reversing shaft 17 through arm 14 and rod 41 is directly connected to the lower portion of the three-armed lever 8 shown by Figs. 1 and 5. This said lever 8 is fulcrumed on pin 12 which is rigidly connected with housing 3. One extension of lever 8 carries a roller 7 which is in permanent contact with cam profile of cam-nut 2. Another extension of arm 8 is connected through link 9 to piston 10, which slides in a cylindrical bore which is part of the casing 11. By admitting fluid pressure through 19 to the piston 10, the three-armed lever 8 is found at all times maintaining contact through the roller 7 and the cam profile, thus eliminating any possible lost motion due to wear.

The two extreme positions of the lower eye of cam-nut 2 are indicated by 36 and 37 respectively. The two extreme positions of the lower portion of the lever 8, which connects through rod 41 to the reversing shafts 16 are indicated by 38 and 39 respectively. In order to obtain equal maximum displacements of reversing shafts 16 and 17 respectively, the length of their arms 14 and 15 is selected to compensate for the discrepancy of travel of the points of attachment for rods 40 and 41.

In order to prevent any undesirable overtravel, a limit of the movement of the cam-nut is set by machined boss 42 on piston 10, which butts against the detachable cylinder head. Screw 43 provides an effective stop of the movement in the opposite direction. Figures 7 and 8 show in detail the provision made to give a visible indication of the adjustment made to the valve gear. Shaft 28 connects directly to the rotor of the reversible motor 23. The housing 27 is bolted to the housing of the said reversible motor. Hand wheel 29, which is provided with a smooth rim, makes it possible to operate manually the reversing mechanism in the event of a failure of the air or current supply to motor 23. Through a pair of mitre gears 30 and 31 threaded spindle 32, which is journaled in housing 33 moves indicator 34, which slides in a slot. A suitably graduated panel 35, which is right in front of the engineer, gives at all times a clear indication of the cut-off rate. This location of the indicating mechanism constitutes a decided improvement over the customary style of cut-off indicators and it lends itself particularly well to an electric illumination by light reflection. The cab valve 22 permits the alternative admission of compressed air or steam through pipe 20 and opening 19 to piston 10. A drain cock at 21 is provided for winter operation.

The scope of this invention is not limited to the construction as disclosed by the foregoing specification of the preferred embodiment of this invention. But it can also be widened by those skilled in the art to apply generally to a variable ratio mechanism to operate two reversing shafts through one single manual control in a manner conductive to the best possible valve events in the steam cycle in the power cylinders.

What I claim is:

1. In power reverse gear for steam engines or steam locomotives of the character described, in which the movements of two or more sets of valve gear reversing mechanisms are co-ordinated by means of a variable ratio transmission actuated through a single manual control in the cab, said variable ratio transmission comprising a threaded shaft, a sliding cam-nut, a roller held permanently in contact with the cam profile of said sliding cam-nut, a lever carrying the said roller, means to connect the said sliding cam-nut and the said lever to the two or more respective sets of valve gear reversing mechanism.

2. In power reverse gear for steam engines or steam locomotives of the character described in which the movements of two or more sets of valve gear reversing mechanisms are co-ordinated by means of a variable ratio transmission mechanism, actuated through a single manual control in the cab, said variable ratio transmission mechanism comprising a threaded shaft, a sliding cam nut, said sliding cam nut engaging with the aforesaid threaded shaft by means of a thread of the self-locking type, a roller held permanently in contact with the cam profile of the said sliding cam nut, means to maintain the aforesaid roller in contact with the aforesaid cam profile regardless of wear, a lever carrying the said roller, means to connect the said sliding cam nut and the said lever to the two or more respective sets of valve gears reversing mechanisms.

3. In power reverse gear for steam engines or steam locomotives of the character described in which the movements of two or more sets of valve gear reversing mechanisms are co-ordinated by means of a variable ratio transmission mechanism, actuated through a single manual control in the cab, said variable ratio transmission mechanism comprising a threaded shaft, a sliding cam nut, said sliding cam nut engaging with the aforesaid threaded shaft by means of a thread of the self-locking type, a roller held permanently in contact with the cam profile of the said sliding cam nut through the provision of a moveable piston connected with part of a lever carrying the said roller, said moveable piston being subjected to fluid pressure.

4. In power reverse gear for steam engines or steam locomotives of the character described, in which the movement of two or more sets of valve gear reversing mechanisms are co-ordinated by means of a variable ratio transmission mechanism, actuated through a single manual control in the cab, said variable ratio transmission mechanism comprising a threaded shaft, a sliding cam nut, a roller held permanently in contact with the cam profile of the said sliding cam nut, a lever carrying the said roller, said lever being fulcrumed on a shaft, the cam profile of the aforesaid sliding cam nut being shaped in such a way that a progression at a uniform rate of linear speed of the said sliding cam nut corresponds to an angular displacement of the aforesaid shaft taking place at a variable rate of speed, said variation consisting of a relatively high rate of angular velocity at the commencement of the cycle being followed by a very slow rate of velocity to be followed again by a relatively high rate of angular velocity of the said shaft toward the end of the cycle.

THOMAS J. HOY.